Oct. 11, 1960  J. T. WINSETT  2,955,368
SNOW CLEARING ATTACHMENT FOR MOTOR VEHICLES
Filed July 22, 1958

INVENTOR.
JOSEPH T. WINSETT
BY
ATTORNEY

United States Patent Office 2,955,368
Patented Oct. 11, 1960

2,955,368

SNOW CLEARING ATTACHMENT FOR MOTOR VEHICLES

Joseph T. Winsett, 1326 Home Ave., Dayton 7, Ohio

Filed July 22, 1958, Ser. No. 750,118

4 Claims. (Cl. 37—42)

This invention relates to an attachment for automotive vehicles and the like, and it particularly relates to apparatus for cleaning away snow from in front of the front wheels of the vehicle.

Although much effort has heretofore been devoted toward increasing the traction of the rear wheels of a vehicle when driving on snow and ice, little has been done for the front wheels. However, it has been demonstrated that when driving on snow, particularly when the snow is deep, it is the front wheels that are held up and that act to stall the vehicle.

It is, therefore, one object of the present invention to provide a mechanism for automobiles or the like which acts to make a path through the snow in front of the front wheels as the vehicle moves forward.

It is another object of the present invention to provide apparatus for clearing a path in front of the front tires of a vehicle wherein the apparatus can be readily attached and removed from the vehicle.

Another object of the present invention is to provide an apparatus of the above type which is adapted to receive its actuating power from the engine of the vehicle.

Other objects of the present invention are to provide an improved apparatus, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
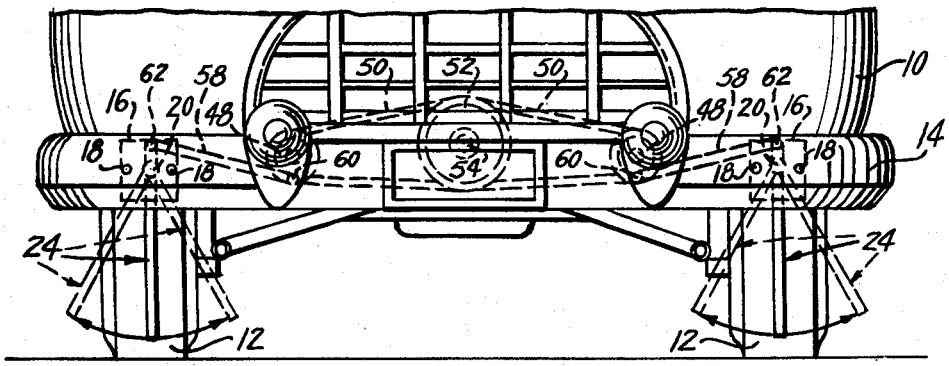
Fig. 1 is a fragmentary, front elevational view of an automobile provided with an attachment embodying the present invention.
Figure 2:
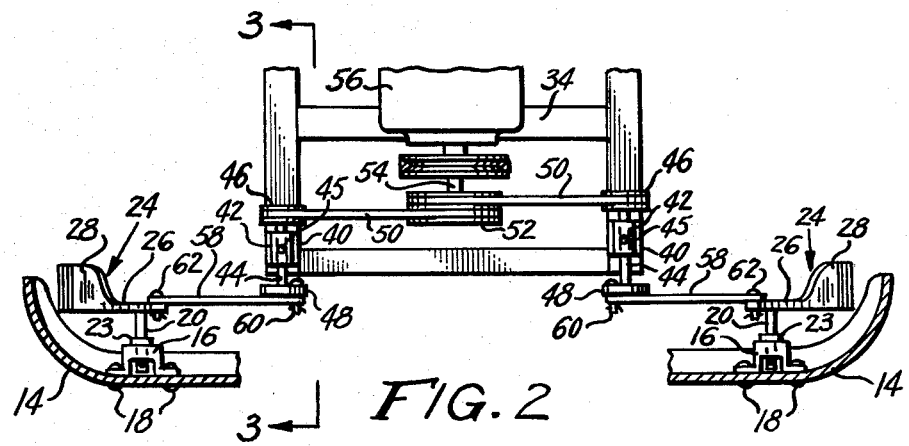
Fig. 2 is a top plan view of the assembly of Fig. 1 with parts broken away and parts shown in section.

Referring in greater detail to the drawing wherein similar reference characters refer to similar parts, there is shown an automobile 10 having wheels 12 at the front end thereof and a front bumper 14 in front of the wheels 12.

Provided on the inner side of the bumper 14, at each end thereof, is a bracket 16 connected to the bumper by bolts, rivets or the like indicated at 18. Each bracket 16 is provided with a central opening serving as a bearing means through which extends a shaft 20. The shaft 20 is rotatable in the bearing formed by bracket 16 but is held against axial movement therein by a removable pin 22 extending through a transverse hole adjacent the inner end of the shaft 20 (note particularly Fig. 3). A collar 23 surrounds each shaft 20 rearwardly of the bracket 16.

At the outer end of each shaft 20 is provided a sweeper 24 comprising an arm 26 at the end of which is a broad blade 28. Each blade 28 includes an upper portion 30, which is integral with arm 28 and is constructed of a similar rigid material such as steel, cast iron or the like, and a lower portion 32 which is relatively flexible and may be constructed of sheet metal, hard or semi-hard rubber or the like. The purpose of this type of construction is to permit the lower end of the blade to hit the road without breaking while yet providing sufficient rigidity to permit efficient operation of the blade.

Figure 3:
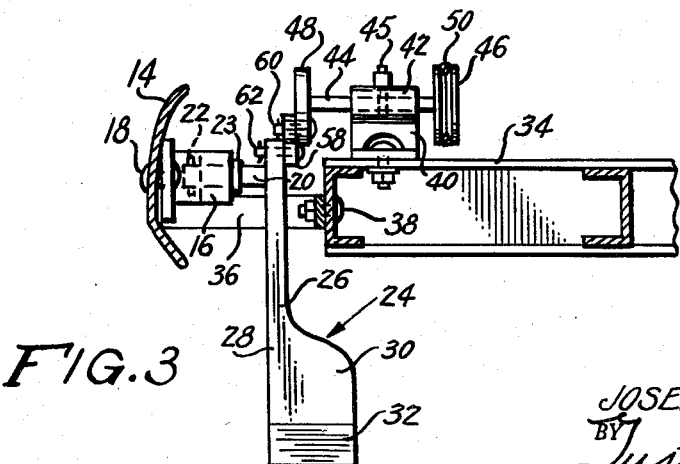
Fig. 3 is a view, partly in section and partly in elevation, taken on line 3—3 of Fig. 2.

As shown in Fig. 3, the bumper 14 is connected to the frame 34 of the car by a bracket 36 bolted to the chassis frame 34 at 38. The chassis frame 34 also supports a pair of brackets 40, one on each side, and each of these brackets 40 is provided with a bearing 42 through which extends a shaft 44 lubricated by an oil cup 45. The shafts 44 are each provided with a pulley 46 at one end and a disc forming a crank arm 48 at the other end. The pulleys 46 are each connected by oppositely disposed belts 50 to a twin pulley 52 mounted on the motor shaft 54 of motor 56. Motor or engine 56 is the power plant of the vehicle.

Each disc or crank arm 48 is eccentrically connected to a link 58 by a removable pin 60. The opposite end of each link 58 is connected by a removable pin 62 to the upper end of the corresponding arm 26 of sweeper 24.

The operation of the device is obvious from the above description taken together with the drawing. Briefly, with the attachment in position adjacent each front wheel, the engine of the car, when it is actuated, rotates the pulleys 46 in opposite directions by means of twin pulley 52 and belts 50. This operates the cranks 48 to rock the links 58 in an oscillating motion. The links 58, in turn, cause the blades 24 to sweep back and forth in front of the corresponding wheels 12 to sweep a path through the snow. When the engine is turned off, the blades are also stopped. Removing pins 60 and 22 permits the sweeper to be made inoperative as in the summer time, and belts 50 may be temporarily removed, as in winter, when no snow is present, without removing pins 60 and 22. However, with pins 60 and 22 removed, the operating parts can likewise be removed for storage.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In combination, an engine-driven vehicle having a drive engine, front and rear wheels and a bumper bar in front of said front wheels, a pair of brackets extending rearwardly from said bumper bar toward said front wheels, each bracket being positioned opposite a corresponding front wheel, a rotatable shaft in each bracket, a sweeper blade on each shaft, and a link connecting each blade to a crank, each crank being operatively connected for rotation to said engine, each blade comprising a rigid arm connected to the corresponding shaft and a flexible end portion.

2. In combination, an engine-driven vehicle having a drive engine, front and rear wheels and a bumper bar in front of said front wheels, a pair of brackets extending rearwardly from said bumper bar toward said front wheels, each bracket being positioned opposite a corresponding front wheel, a rotatable shaft in each bracket, a sweeper blade on each shaft, and a link connecting each blade to a crank, each crank being operatively connected for rotation to said engine, said shafts being each provided with a removable pin holding it against axial movement relative to the corresponding bracket.

3. In combination, an engine-driven vehicle having a drive engine, front and rear wheels and a bumper bar in front of said front wheels, a pair of brackets extending rearwardly from said bumper bar toward said front wheels, each bracket being positioned opposite a corresponding front wheel, a rotatable shaft in each bracket, a sweeper blade on each shaft, and a link connecting each blade to a crank, each crank being operatively connected for rotation to said engine, and means releasably connecting each link both to the corresponding blade and the corresponding crank.

4. An attachment for engine-driven vehicles comprising a pair of oscillatable blades operatively connected to a twin pulley for opposed oscillation thereby, said pulley being adapted to be connected to the shaft of an engine, and means for connecting said blades to a support for oscillation relative thereto, said blades being each connected to said twin pulley through secondary pulleys having oppositely rotatable belts between said twin pulley and themselves, said secondary pulleys being operatively connected to crank means which are, in turn, connected by linkage to the respective blades.

References Cited in the file of this patent

UNITED STATES PATENTS

| | | |
|---|---|---|
| 562,978 | Rosenberger | June 30, 1896 |
| 730,206 | Flagg | June 2, 1903 |
| 1,270,453 | Smith | June 25, 1918 |
| 1,601,718 | Buttweiler | Oct. 5, 1926 |
| 2,171,056 | Clay | Aug. 29, 1939 |
| 2,372,621 | Williams | Mar. 27, 1945 |
| 2,518,622 | Ingersoll | Aug. 15, 1950 |
| 2,673,997 | Richey et al. | Apr. 6, 1954 |
| 2,731,840 | Barba | Jan. 24, 1956 |
| 2,753,584 | Oishei | July 10, 1956 |

FOREIGN PATENTS

| | | |
|---|---|---|
| 85,661 | Switzerland | Oct. 16, 1920 |